Nov. 28, 1950     R. R. RANEY ET AL     2,532,076
ADJUSTABLE AXLE CONSTRUCTION FOR POTATO PLANTERS
Filed March 9, 1949     2 Sheets-Sheet 1
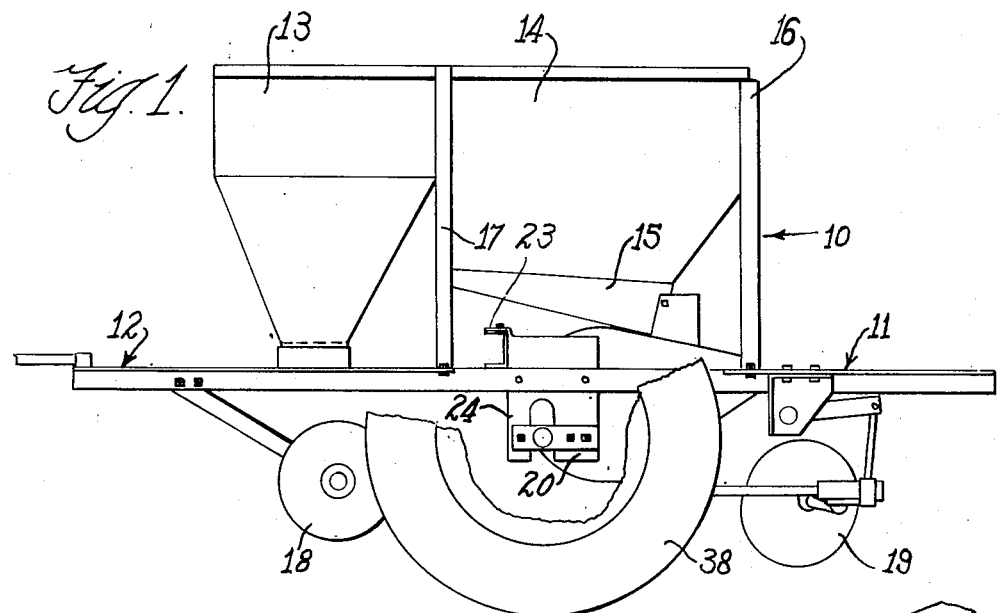
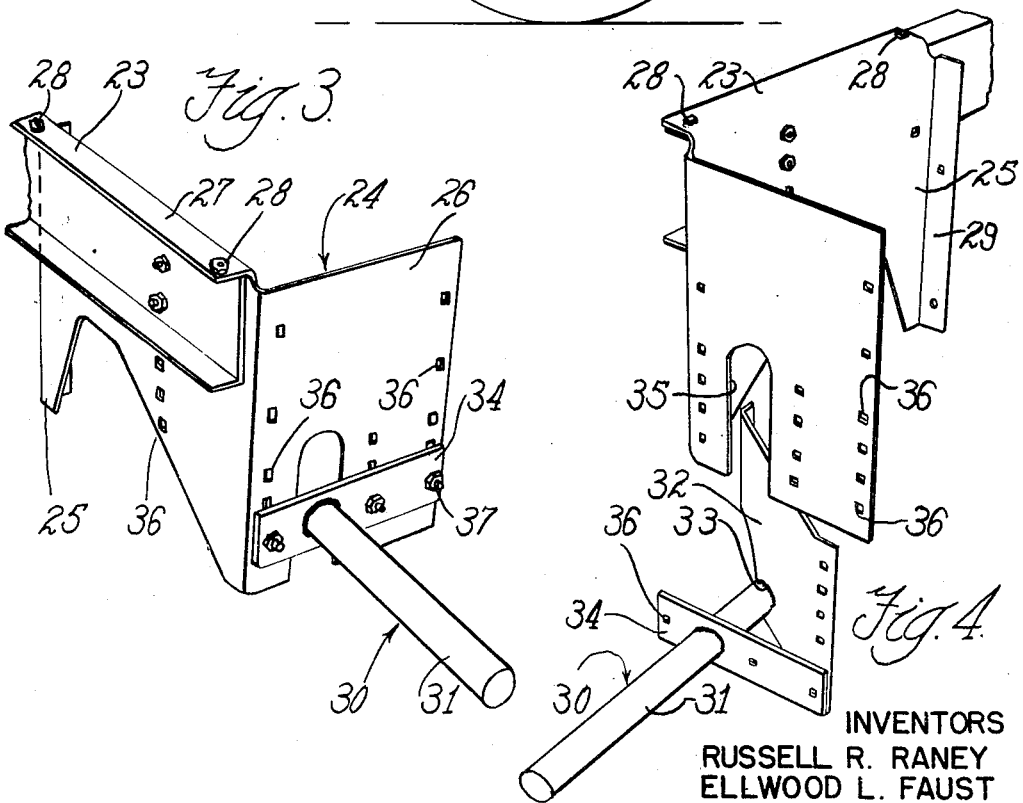
INVENTORS
RUSSELL R. RANEY
ELLWOOD L. FAUST
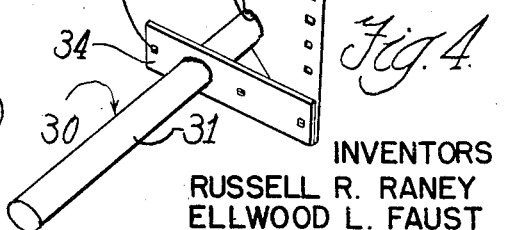

Patented Nov. 28, 1950

2,532,076

UNITED STATES PATENT OFFICE 2,532,076

ADJUSTABLE AXLE CONSTRUCTION FOR POTATO PLANTERS

Russell R. Raney, La Grange, and Ellwood L. Faust, Elmhurst, Ill., assignors to International Harvester Company, a corporation of New Jersey Application March 9, 1949, Serial No. 80,544

12 Claims. (Cl. 280—43)

This invention relates to an improved frame construction for a wheeled vehicle and more particularly to an axle support therefor.

More specifically the invention relates to an improved axle construction for a wheel frame adapted to support an agricultural implement such as a potato planter.

The prime object of this invention is to provide an improved frame construction for an agricultural implement of a type known as a potato planter.

Still another object is to provide a frame for a potato planter, said frame including adjustable wheel and axle supports.

A still further object is to provide a potato planter frame having adjustable wheel supports permitting independent vertical adjustment of wheel carrying stub axles.

A still further object is to provide an improved axle support for securely connecting a wheel support to an implement frame in a manner permitting ready and quick adjustment of the vertical height of the wheels.

A still further object is to provide an improved frame construction embodying a pair of L-shaped axle supports, each support including a wheel support adjustably connected to the axle support and forming therewith a rigid triangular support for carrying a stub axle.

These and other objects will become more readily apparent from a reading of the description when examined in connection with the accompanying sheets of drawings.

In the drawings:

Fig. 1 is a side elevational view of a potato planter mounted on a wheel supported frame structure.

Fig. 3 is a perspective view of an axle support.

Fig. 4 is a perspective view of an axle support showing the cooperating relation with a wheel carrying support.

Figure 2:
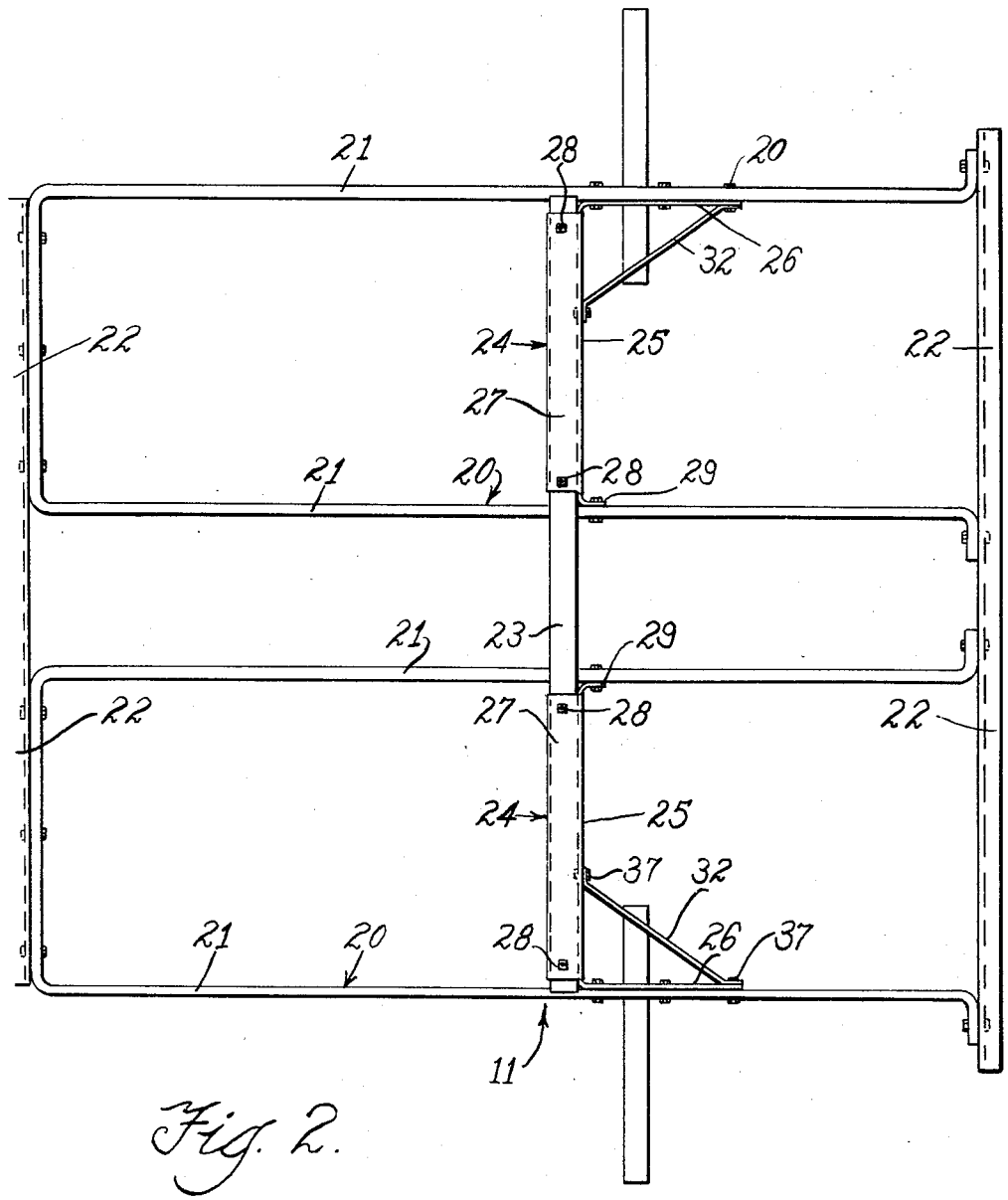
Fig. 2 is a plan view of a rectangular frame structure for supporting a planter mechanism.

Referring particularly to Fig. 1, a potato planter structure is designated by the reference character 10. The potato planter includes a rectangular frame structure 11 being provided at its forward end with a draft portion 12. The draft portion is adapted to be connected to a draw bar of a conventional type of tractor, not shown, for moving the planter throughout the field. The frame 11 supports a fertilizer hopper 13, and a seed box 14 is positioned adjacent thereto. The seed box 14 is adapted to deliver potato seed to a discharge section 15 in a conventional manner well known to those familiar with the art. The seed box 14 and discharge section 15 are suitably supported by means of vertical supports 16 and 17. The forward portion of the planter is provided with an opening disk structure 18, and the rearward end is provided with a covering disk structure 19.

Referring particularly to Fig. 2, the frame structure 11 comprises a pair of U-shaped rectangular structures 20 positioned in spaced transverse relation. The structures 20 include a plurality of longitudinally extending frame members 21. The frame members 21 are connected at their forward and rear ends by transverse supporting members 22. Positioned between the ends of the longitudinal frame members 21 is a transversely extending beam or channel 23 which is securely connected to the frame structure 11.

Referring particularly to Figs. 2 and 3, axle supports 24 are illustrated. The axle supports are positioned in transversely spaced relation on the frame structure 11 and include upright L-shaped plate members, each support having a transversely extending portion 25 and a longitudinally extending portion 26. As best shown in Figs. 3 and 4, the transversely extending portion 25 is provided at its upper end with an angularly bent edge 27 which is adapted to overlap the transverse beam 23 and which is rigidly secured thereto by bolts 28. As best shown in Figs. 2 and 4, the innermost end of the transverse portion 25 is also provided with an angularly bent edge 29 which is rigidly connected to the inner longitudinally extending frame members 21. The transversely extending portion 25 and the longitudinally extending portion 26 are respectively connected to the transverse beam 23 and the longitudinally extending frame members 21 by means of bolts and nuts. It is, of course, understood that this connection is rigid and may be secured by welding or other fastening means.

Each axle support 24 is adapted to support a wheel support generally indicated by the reference character 30. Each wheel support 30 includes a stub axle 31 which projects outwardly from and underneath the frame 11. The stub axle extends through a brace 32 and is suitably connected to the brace by means of welding 33 as best indicated in Fig. 4. The brace 32 extends diagonally with respect to the axle supports 24 and is adapted to be connected to the supports to provide a sturdy triangular supporting structure. A strap 34 is rigidly connected to the stub axle 31 and extends transversely outwardly with respect to the same.

The stub axle 31 extends through an open end slot 35 formed in the longitudinal portion 26 of the axle support 24. The stub axle may readily be adjusted vertically in the slot 35. The transverse portion 25, the longitudinal portion 26, the strap 34, and the diagonal brace 32 are all provided with a number of openings 36, these openings permitting adjustment of the wheel support 30 with respect to the axle support 24. Bolt and nut securing members are inserted into the openings 36 of the respective parts for securely fastening the parts in assembly. It must be appreciated that these securing members are readily detachable whereby the stub axle may be adjusted with respect to the axle support whenever it is necessary to effect vertical height adjustment of the frame with respect to the ground. The stub axle 31 is adapted to support a ground wheel 38. The axle supports 24 are positioned in transverse alinement on the frame 11. The stub axles extend inwardly into the frame structure 11 where they are rigidly supported by the triangular structures formed. In an implement of the potato planter type the numerous driving mechanisms and parts for the potato planter make it desirable to employ stub axles which do not extend completely across the frame structure so that sufficient room and clearance on the frame are had for the various elements of the planter mechanism. By the novel arrangement shown the stub axles are independently adjustable vertically with respect to the frame so that the distance from the ground may be adjusted depending on the particular field conditions existing during the planting operation.

As best shown in Fig. 4, the stub axle is rigidly secured to the strap 34 and diagonal brace 32. In order to assemble the structure, all the operator need do is to slide the stub axle in the slot 35 in the position desired so that the respective holes 36 between the brace, strap, transverse and longitudinal portion of the axle support are in alinement whereupon the parts can be readily bolted together in assembly. Also by virtue of the unique construction employed it is clear that the wheel support 30 can readily be replaced where conditions so require. The triangular frame structure clearly provides a strong and rigid support for the axle in an efficient and inexpensive manner wherein a maximum amount of load carrying ability is provided in a structure that will necessitate a minimum amount of space. The vertical and transverse stresses on the stub axle are easily absorbed by the triangular supporting structure provided, and the wheel support may readily be replaced or adjusted in the field with a minimum of effort on the part of the operator.

It is believed that a novel axle and wheel support has been provided which will clearly accomplish the objects stated. It is to be understood, of course, that changes and modifications may be made which do not depart from the spirit of the invention nor the scope thereof as defined in the appended claims.

What is claimed is:

1. An axle support for a wheeled frame comprising an upright plate member having a longitudinal portion and a transversely extending portion connected thereto, the longitudinal extending portion including a vertical slot, a brace extending diagonally for connection to the ends of the longitudinal portion and the transversely extending portion, an axle extending through the slot, means connecting the axle to said brace, a strap connected to the axle and extending transversely with respect to the axle, and means adjustably connecting said brace and said strap to said plate member whereby said axle may be vertically adjusted within said slot.

2. A wheeled frame structure comprising a plurality of longitudinally extending frame members, transverse beams connecting said frame members, a pair of transversely spaced axle supports connected to the frame structure, each support including an upright plate member having a longitudinal portion connected to a longitudinal frame member and a transverse portion connected to a transverse beam, a wheel support including an axle projecting through the longitudinal portion, a brace having one end connected to the longitudinal portion of said plate member, said brace extending diagonally for connection to the transverse portion of the plate members, and means adjustably connecting said wheel support to said axle support to provide for vertical adjustment of the axle.

3. An axle support for a wheeled frame comprising an upright plate member having a longitudinal portion and a transversely extending portion connected thereto, said longitudinal portion including an open end slot, a wheel support carried by said axle support, said wheel support including an axle projecting through the slot, a brace extending diagonally for connection to the ends of the longitudinal and transverse members thereby providing a triangular box structure, means connecting said axle to said diagonal brace, and means adjustably connecting said wheel support to said axle support whereby said wheel support may be vertically adjusted.

4. An axle support for a wheeled frame comprising an L-shaped upright plate member, a portion of said plate member having a vertically extending slot, a wheel support for said axle support, said wheel support including a stub axle projecting through said slot, a diagonal brace rigidly connected to said stub axle, adjustable securing means connecting said brace to the L-shaped plate member and providing therewith a triangular structure, a strap connected to and extending laterally with respect to said stub axle, and adjustable connecting means for securing said strap to said plate member whereby said stub axle may be vertically adjusted with respect to said axle support.

5. An axle support for a wheeled frame comprising an L-shaped upright plate member, said plate member having a section provided with a vertical slot, a wheel support for said axle support, said wheel support including a stub axle projecting outwardly from each side of the slotted section, a diagonal brace rigidly connected to said stub axle, a strap connected to said axle, and a plurality of fastener members connecting said strap and said diagonal brace to said plate member, said fastener members being quickly detachable to provide for vertical adjustment of said wheel support with respect to said axle support.

6. A wheeled structure comprising a longitudinal frame, a pair of laterally spaced axle supports connected to the frame, each support including an upright L-shaped plate member having a vertically slotted section, a wheel support for each axle support, each wheel support including a stub axle adapted to be vertically moved in the slotted section, a diagonally extending brace engaging the L-shaped member, means connecting said stub axle to said diagonal brace, a strap connected to said stub axle and projecting laterally outwardly with respect to the axle, and quick detachable means connecting said strap and said brace to said L-shaped member whereby said wheel support may be quickly disconnected and vertically adjusted with respect to the axle support.

7. A wheeled structure comprising a longitudinal frame, a transverse member connected to the frame, a pair of laterally spaced axle supports connected to the frame, each support including an upright L-shaped plate member having a vertically slotted section, a wheel support for each axle support, said wheel support including a stub axle adapted to be vertically moved in the slotted section, a diagonally extending brace engaging the L-shaped member and providing with said member a triangular structure, means connecting said stub axle to said diagonal brace, a strap connected to said stub axle and projecting laterally outwardly with respect to the axle, and quick detachable means connecting said strap and said brace to said L-shaped member whereby said wheel support may be quickly disconnected and vertically adjusted with respect to the axle support.

8. A wheeled structure comprising a longitudinal frame, a transverse member connected to the frame, a pair of laterally spaced axle supports connected to the frame, each support including an upright L-shaped plate member having a section provided with an open end slot, the section projecting vertically below the frame, a wheel support for each axle support, each wheel support including a stub axle projecting through and vertically adjustable in the open end slot, a diagonally extending brace engaging said L-shaped plate member and providing with said member a triangular structure; means connecting said stub axle to said diagonal brace, a strap connected to said stub axle, means connecting said strap to said slotted section in substantially parallel relation, and quick detachable means for connecting said diagonal brace to said L-shaped member whereby said wheel support may be quickly disconnected and adjusted with respect to said frame.

9. A wheeled frame structure comprising a plurality of longitudinally extending frame members, transverse beams connecting said frame members, a pair of transversely spaced axle supports connected to the frame structure, each support including an upright plate member having a longitudinal portion connected to a longitudinal frame member and a transverse portion connected to a transverse beam, said longitudinal portion having a vertical open end slot, a wheel support including an axle projecting through the slot, a brace having one end engaging one end of the longitudinal portion of said plate member, said brace extending diagonally and engaging one end of said transverse portion of the plate member, and connecting means for adjustably connecting said brace member and said axle to said axle support whereby said axle may be vertically adjusted in the slot.

10. A wheeled frame structure comprising a plurality of longitudinally extending frame members, transverse beams connecting the longitudinal frame members, a pair of transversely spaced axle supports connected to the frame structure, each support including an upright L-shaped plate member, said plate member having a vertically extending slot, a wheel support for each axle support, each wheel support including a stub axle projecting through the slot of the L-shaped plate member, a diagonal brace adjustably connected to said L-shaped plate member and forming with said member a triangular support, means connecting said axle to said brace, and adjustable means connecting said axle to said L-shaped plate member whereby said axle may be vertically adjusted on said axle support.

11. A wheeled frame structure comprising a plurality of longitudinally extending frame members, a pair of transverse beams connecting the ends of said frame members in substantially parallel transversely spaced relation, a transverse supporting member connected to and positioned between the ends of the frame members, a pair of laterally spaced axle supports connected to the frame structure, each support including an upright plate member having a longitudinal portion and a transverse portion, connecting means respectively connecting the transverse portion to the transverse supporting member and the longitudinal portion to the longitudinal frame members, said transverse portion having an angularly bent reinforcing edge engaging the transverse member, said longitudinal portion having a slotted section projecting downwardly below the frame structure, a wheel support for each axle support, each wheel support including a stub axle projecting through and slidable within the slotted section, a diagonal brace connected to the longitudinal portion and to the transverse portion providing with said plate member a triangular frame structure, means rigidly connecting one end of said stub axle to said brace, and means connecting said strap to said slotted section, each stub axle and each diagonal brace being constructed and arranged to provide for vertical height adjustment of said wheel supports with respect to said axle supports.

12. A wheeled frame structure comprising a plurality of longitudinally extending frame members, transverse beams connecting said frame members, a pair of transversely spaced axle supports connected to said frame members, each axle support including an upright plate having a longitudinal portion connected to the frame structure, said longitudinal portion including a vertical slot, a wheel support for each axle support, each wheel support including an axle projecting through the slot and having one portion projecting inwardly toward the frame and another portion projecting outwardly from the frame, a brace connected to the inwardly projecting portion, means adjustably supporting the brace on the frame structure, a strap connected to the axle, and means adjustably connecting the strap to the upright plate whereby the wheel support may vertically be adjusted with respect to said plate.

RUSSELL R. RANEY.
ELLWOOD L. FAUST.

REFERENCES CITED

The following references are of record in the file of this patent:

UNITED STATES PATENTS

| Number | Name | Date |
|---|---|---|
| 832,628 | Schreffler | Oct. 9, 1906 |
| 1,840,599 | Nibbe | Jan. 12, 1932 |